United States Patent
Nate et al.

(10) Patent No.: US 9,577,511 B2
(45) Date of Patent: *Feb. 21, 2017

(54) PFC DC/AC/DC POWER CONVERTER WITH REDUCED POWER LOSS

(71) Applicant: ROHM CO., LTD., Ukyo-Ku, Kyoto (JP)

(72) Inventors: Satoru Nate, Kyoto (JP); Hiroshi Hayashi, Kyoto (JP)

(73) Assignee: ROHM CO., LTD (JP)

( * ) Notice: Subject to any disclaimer, the term of this patent is extended or adjusted under 35 U.S.C. 154(b) by 107 days.

This patent is subject to a terminal disclaimer.

(21) Appl. No.: 14/570,234

(22) Filed: Dec. 15, 2014

(65) Prior Publication Data
US 2015/0098253 A1 Apr. 9, 2015

Related U.S. Application Data

(63) Continuation of application No. 13/475,138, filed on May 18, 2012, now Pat. No. 8,942,016.

(30) Foreign Application Priority Data

May 19, 2011 (JP) ................. 2011-112550

(51) Int. Cl.
H02M 3/335 (2006.01)
H02M 1/42 (2007.01)
H02J 9/00 (2006.01)
H02M 1/00 (2006.01)

(52) U.S. Cl.
CPC ........... *H02M 1/42* (2013.01); *H02M 1/4225* (2013.01); *H02M 3/33507* (2013.01); *H02M 3/33569* (2013.01); *H02J 9/005* (2013.01); *H02M 2001/007* (2013.01); *H02M 2001/0032* (2013.01); *Y02B 70/126* (2013.01); *Y02B 70/16* (2013.01)

(58) Field of Classification Search
CPC ....................................... H02M 3/335
USPC ........................ 323/222, 266, 284; 363/89
See application file for complete search history.

(56) References Cited

U.S. PATENT DOCUMENTS

| | | |
|---|---|---|
| 5,726,871 A | 3/1998 | Choi |
| 5,856,917 A | 1/1999 | Aonuma et al. |
| 5,910,891 A | 6/1999 | Jo |
| 6,031,748 A | 2/2000 | Hong |
| 6,344,986 B1 | 2/2002 | Jain et al. |
| 7,012,818 B2 | 3/2006 | Kotsuji et al. |
| 2002/0101750 A1 | 8/2002 | Malik et al. |
| 2003/0063479 A1 | 4/2003 | Morita et al. |

(Continued)

*Primary Examiner* — Jeffrey Sterrett
(74) *Attorney, Agent, or Firm* — Cantor Colburn LLP

(57) ABSTRACT

A second control circuit is configured to switch a pulse signal to a level which turns off a second switching transistor when a coil current that flows through a primary winding reaches a predetermined threshold current. The second control circuit is configured to start a switching operation when a power supply for an electronic device is turned on, to set the threshold current to a first value when an intermediate voltage is higher than a predetermined level, and to set the threshold current to a second value that is lower than the first value when the intermediate voltage is lower than a predetermined level. A first control circuit is configured to start a switching operation upon receiving an instruction from a microcontroller to start operating.

13 Claims, 6 Drawing Sheets

(56) References Cited

U.S. PATENT DOCUMENTS

| | | |
|---|---|---|
| 2003/0099119 A1 | 5/2003 | Yamada et al. |
| 2003/0107906 A1 | 6/2003 | Tokunaga et al. |
| 2004/0218410 A1 | 11/2004 | Yamada et al. |
| 2005/0088862 A1 | 4/2005 | Simada et al. |
| 2007/0081364 A1 | 4/2007 | Andreycak |
| 2008/0284401 A1 | 11/2008 | Oettinger et al. |
| 2010/0165679 A1 | 7/2010 | Lu et al. |
| 2010/0302808 A1 | 12/2010 | Uemura et al. |
| 2012/0236612 A1 | 9/2012 | Uno |
| 2012/0294046 A1 | 11/2012 | Nate et al. |
| 2014/0160804 A1 | 6/2014 | Sato et al. |
| 2014/0218988 A1 | 8/2014 | Hayashi et al. |
| 2015/0098253 A1* | 4/2015 | Nate .................. H02M 1/4225 363/21.01 |

* cited by examiner

PFC DC/AC/DC POWER CONVERTER WITH REDUCED POWER LOSS

CROSS REFERENCE

This application is a continuation under 35 U.S.C. §120 of U.S. application Ser. No. 13/475,138, filed May 18, 2012, which is incorporated herein reference and which claimed priority to Japanese Application No. 2011-112550, filed May 19, 2011, the entire content of which is also incorporated herein by reference.

BACKGROUND OF THE INVENTION

1. Field of the Invention

The present invention relates to a power supply apparatus.

2. Description of the Related Art

Various kinds of consumer electronics devices such as TVs, refrigerators, etc., or otherwise electronic devices such as laptop computers, cellular phone terminals, and PDAs (Personal Digital Assistants), are each configured to operate receiving electric power from an external circuit, and to be capable of charging a built-in battery using electric power received from an external power supply. Such consumer electronics devices and electronic devices (which will collectively be referred to as "electronic devices" hereafter) each include a built-in power supply apparatus configured to perform AC/DC conversion of commercial AC voltage. Alternatively, such a power supply apparatus is configured as a built-in component included within an external power supply adapter (AC adapter) for such an electronic device.

FIG. 1 is a block diagram which shows a configuration of an electronic device 1r including a power supply apparatus 2r according to a comparison technique investigated by the present inventors. The electronic device 1r includes the power supply apparatus 2r and various kinds of function circuits (loads) 4a and 4b such as a microcontroller 3 etc. Examples of the loads 4a and 4b include a display panel, a driver for such a display panel, an audio processing circuit, an image processing circuit, and so forth.

The power supply apparatus 2r includes a fuse 6, a filter 8 configured to remove noise from commercial AC voltage Vac, a rectifier circuit (diode bridge circuit) 10 configured to rectify the commercial AC voltage Vac, a power factor correction circuit (PFC circuit) 20r, a first insulation type DC/DC converter 30r, and a second insulation type DC/DC converter 40r.

The PFC circuit 20r is configured to monitor the AC input voltage Vac and the input current Iac, and to control the phases of the input voltage Vac and the input current Iac such that they match each other, thereby maintaining the power factor in the vicinity of 100%.

The electronic device 1r such as a TV or the like has three states, i.e., a shutdown state in which all the functions are disabled, a standby state in which only minimal operations are enabled, and a normal operating state. For example, with an electronic device including two kinds of switches, i.e., a main power supply switch and a standby switch, the shutdown state corresponds to the state in which the main power switch is off, and the standby state corresponds to the state in which the main power supply switch is on and the standby switch is off. The normal operating state corresponds to the state in which both the main power supply switch and the standby switch are turned on.

The first insulation type DC/DC converter 30r is configured to supply the power supply voltage Vdd1 to the load 4a which is configured to operate only in the normal operating state. The first insulation type DC/DC converter 30r is configured to operate only in the normal operating state, and stops operating in the standby state.

However, there is a need to supply the power supply voltage to the microcontroller 3 configured to control the overall operation of the power supply apparatus 2r not only in the normal operating state but also in the standby state. In order to meet this need, the second insulation type DC/DC converter 40r is arranged in order to supply the power supply voltage Vdd2 to the microcontroller 3 (and other loads 4b as necessary), in addition to the first insulation type DC/DC converter 30r. The second insulation type DC/DC converter 40r is configured to always operate in the state in which the main power supply switch is on. A sub-converter using an auxiliary winding is provided to the primary side of a transformer included in the second insulation type DC/DC converter 40r. The output voltage Vcc of the sub-converter is supplied as the power supply voltage for the control circuits (controllers) of the PFC circuit 20r, the first insulation type DC/DC converter 30r, and the second insulation type DC/DC converter 40r.

The power supply apparatus 2r shown in FIG. 1 requires the installation of such insulation type DC/DC converters as two separate circuits, leading to an increased number of components, resulting in an problem of increased costs. In particular, a transformer is costly.

SUMMARY OF THE INVENTION

The present invention has been made in view of such a situation. Accordingly, it is an exemplary purpose of the present invention to provide a power supply apparatus which requires only a small space and which has an advantage of a lower cost.

An embodiment of the present invention relates to a power supply apparatus. The power supply apparatus comprises: a rectifier circuit configured to full-wave rectify AC voltage; a power factor correction circuit including a non-insulation type DC/DC converter configured to receive an output voltage of the rectifier circuit, and to generate a DC intermediate voltage, and configured to operate such that the phase of the input current matches the phase of the AC voltage thus rectified; an insulation type DC/DC converter configured to receive the intermediate voltage, and to convert the level of the intermediate voltage thus received; and a microcontroller configured to operate receiving the output voltage of the insulation type DC/DC converter.

The power factor correction circuit comprises: an inductor arranged such that the output voltage of the rectifier circuit is applied to its first terminal; a first switching transistor arranged between a second terminal of the inductor and a ground terminal; and a first control circuit configured to generate a first pulse signal having a duty ratio such that the intermediate voltage matches its target voltage, and to drive the first switching transistor according to the first pulse signal.

The insulation type DC/DC converter comprises: a transformer; a second switching transistor arranged between a primary winding of the transformer and the ground terminal; and a second control circuit configured to generate a second pulse signal having a duty ratio such that the output voltage of the insulation type DC/DC converter matches its target voltage, and to drive the second switching transistor according to the second pulse signal.

The second control circuit is configured to switch the pulse signal to a level which turns off the second switching transistor when a coil current that flows through the primary winding reaches a predetermined threshold current. Furthermore, the second control circuit is configured to start a switching operation when a power supply for an electronic device is turned on, to set the threshold current to a first value when the intermediate voltage is higher than a predetermined level, and to set the threshold current to a second value that is lower than the first value when the intermediate voltage is lower than a predetermined level. The first control circuit is configured to start a switching operation upon receiving an instruction from the microcontroller to start operating.

Immediately after the power supply is turned on, the power factor correction circuit does not perform its switching operation. Thus, in this stage, the intermediate voltage rises up to the initial voltage level by means of the output capacitor charged via an inductor. On the other hand, the insulation type DC/DC converter starts its switching operation immediately after the power supply is turned on. In this stage, the intermediate voltage is set to the initial voltage level, which is low level. Thus, without any countermeasures, the on time of the second switching transistor becomes long. In order to solve such a problem, with the present embodiment, the threshold current to be compared with the coil current that flows through the primary winding is lowered to the second value so as to limit the on time of the second switching transistor. Upon receiving an instruction from the microcontroller, the power factor correction circuit starts operating. As a result, the intermediate voltage generated by the power factor correction circuit rises toward to the regular target voltage level. When the intermediate voltage reaches a predetermined level, the threshold current used by the insulation type DC/DC converter as a threshold to be compared with the coil current is raised to the first value, thereby removing the limitation on the on time of the second switching transistor.

Such an embodiment reduces power loss in the second switching transistor in a state in which the input voltage of the insulation type DC/DC converter, i.e., the intermediate voltage, is low. That is to say, such an arrangement allows the second switching transistor to have a dramatically reduced size, as compared with an arrangement in which the threshold current to be compared with the coil current is set to a fixed value.

Furthermore, such an arrangement includes such an insulation type DC/DC converter as a single circuit. Thus, such an arrangement provides an advantage of a lower cost and/or an advantage of a reduced space, as compared with conventional arrangements.

Another embodiment of the present invention also relates to a power supply apparatus. The power supply apparatus comprises: a rectifier circuit configured to full-wave rectify AC voltage; a power factor correction circuit including a non-insulation type DC/DC converter configured to receive an output voltage of the rectifier circuit, and to generate a DC intermediate voltage, and configured to operate such that the phase of the input current matches the phase of the AC voltage thus rectified; an insulation type DC/DC converter configured to receive the intermediate voltage, and to convert the level of the intermediate voltage thus received; and a microcontroller configured to operate receiving the output voltage of the insulation type DC/DC converter.

The power factor correction circuit comprises: an inductor arranged such that the output voltage of the rectifier circuit is applied to its first terminal; a first switching transistor arranged between a second terminal of the inductor and a ground terminal; and a first control circuit configured to generate a first pulse signal having a duty ratio such that the intermediate voltage matches its target voltage, and to drive the first switching transistor according to the first pulse signal.

The insulation type DC/DC converter comprises: a transformer; a second switching transistor arranged between a primary winding of the transformer and the ground terminal; and a second control circuit configured to generate a second pulse signal having a duty ratio such that the output voltage of the insulation type DC/DC converter matches its target voltage, and to drive the second switching transistor according to the second pulse signal. The second control circuit is configured to switch the pulse signal to a level which turns off the second switching transistor when a coil current that flows through the primary winding reaches a predetermined threshold current.

The second control circuit is configured to start a switching operation when a power supply for an electronic device is turned on, to set the threshold current to a first value after a predetermined period of time elapses after the power supply is turned on, and to set the threshold current to a second value that is lower than the first value until the predetermined period of time elapses. The first control circuit is configured to start a switching operation upon receiving an instruction from the microcontroller to start operating.

Such an embodiment also reduces power loss in the second switching transistor in a state in which the input voltage of the insulation type DC/DC converter, i.e., the intermediate voltage, is low. Thus, such an arrangement allows the second switching transistor to have a dramatically reduced size.

Furthermore, such an arrangement includes such an insulation type DC/DC converter as a single circuit. Thus, such an arrangement provides an advantage of a lower cost and/or an advantage of a reduced space, as compared with conventional arrangements.

Yet another embodiment of the present invention relates to an electronic device. The electronic device includes a power supply apparatus according to any one of the aforementioned embodiments.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
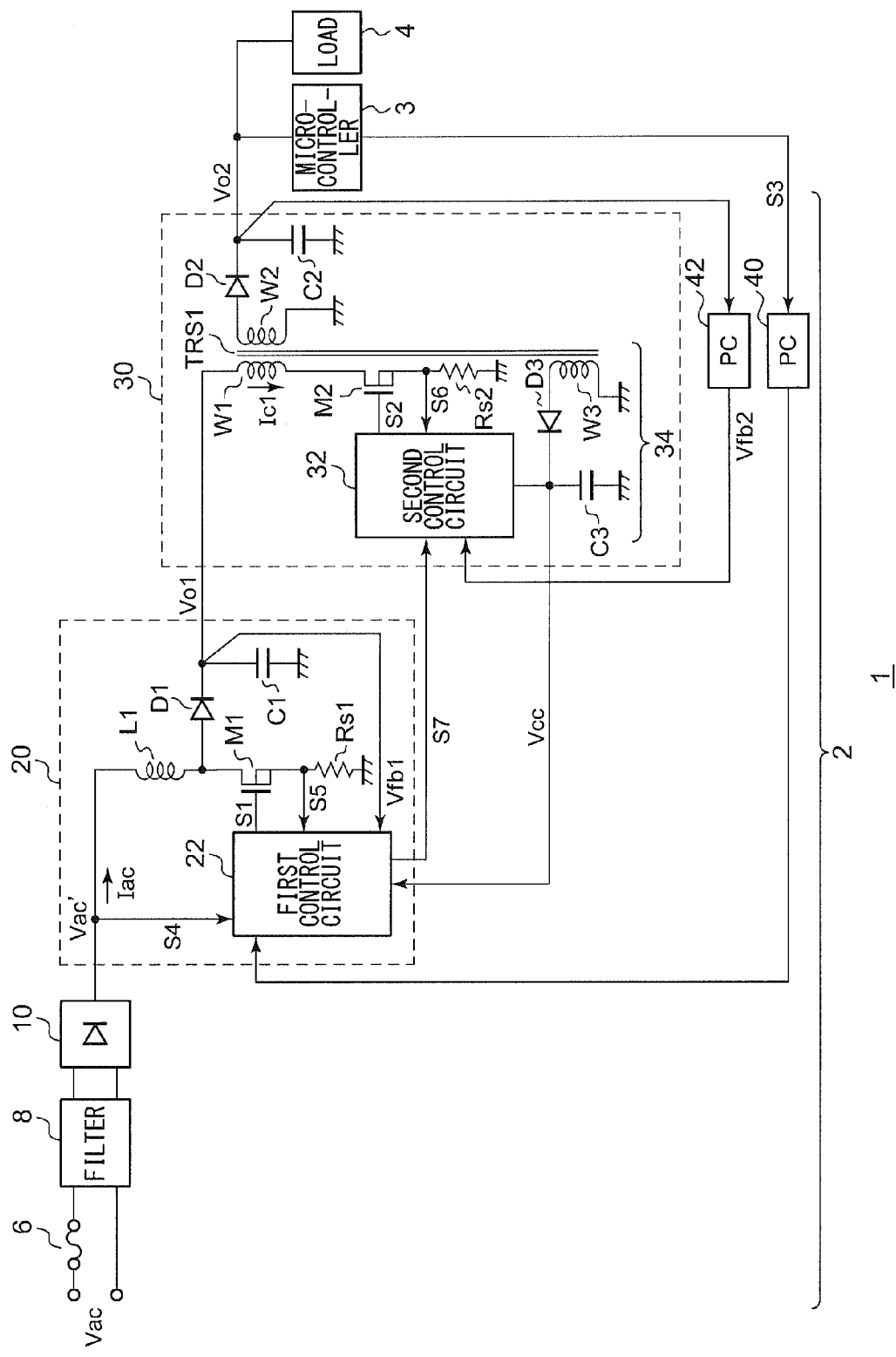
FIG. 2 is a circuit diagram which shows a configuration of an electronic device according to an embodiment.

FIG. 2 is a circuit diagram which shows a configuration of an electronic device 1 according to an embodiment.

The electronic device 1 is configured as a consumer electronics device such as a TV, refrigerator, air conditioner, or the like, or otherwise as a computer, and is not restricted in particular. The electronic device 1 includes a power supply apparatus 2, a microcontroller 3, and a load 4. The electronic device 1 is divided into a primary side and a secondary side that are electrically insulated from one another, which use an insulation transformer TRS1 of an insulation type DC/DC converter 30 as an interface.

The electronic device 1 is configured to be switchable between three states, i.e., a shutdown state in which all the functions are disabled, a standby state in which only minimal functions are enabled, and a normal operating state.

The microcontroller 3 is a processor configured to integrally control the overall operation of the electronic device 1. The microcontroller 3 is configured to operate in two states, i.e., the standby state and the normal operating state.

The load 4 includes various kinds of analog circuits and digital circuits, examples of which include a display panel, a driving circuit for such a display panel, an illumination circuit, a video processing circuit, and an audio processing circuit.

The power supply apparatus 2 includes a fuse 6, a filter 8, a rectifier circuit 10, a PFC circuit 20, and an insulation type DC/DC converter 30.

The filter 8 is configured to remove noise from the AC voltage Vac. The rectifier circuit 10 includes a diode bridge circuit, and is configured to full-wave rectify the AC voltage Vac. The AC voltage Vac' thus full-wave rectified is input to the PFC circuit 20. When a 100-V commercial AC voltage Vac is supplied, the full-wave rectified AC voltage Vac' is on the order of 141 V.

The PFC circuit 20 includes a non-insulation type, step-up DC/DC converter, and is configured to receive the output voltage Vac' of the rectifier circuit 10, and to generate a DC intermediate voltage Vo1. The PFC circuit 20 is configured to operate such that the phase of the input current Iac matches the phase of the AC voltage Vac' thus rectified. In the state in which the PFC circuit 20 operates, the intermediate voltage Vo1 is stabilized in the vicinity of the target voltage level (e.g., 400 V).

In the state in which the PFC circuit 20 does not operate, the output capacitor C1 is charged by the full-wave rectified AC voltage Vac' received via the inductor L1 and the rectifier diode D1. Thus, in this state, the intermediate voltage Vo1 is set to an initial voltage level (which is slightly lower than 141 V) that corresponds to the full-wave rectified AC voltage Vac'.

The insulation type DC/DC converter 30 is configured to receive the intermediate voltage Vo1 generated by the PFC circuit 20, and to convert the level of the intermediate voltage Vo1. As described above, it should be noted that there is a great change in the input voltage Vo1 of the insulation type DC/DC converter 30, which changes between the initial voltage level, i.e., 141 V, and the target voltage level, i.e., 400 V, according to whether or not the PFC circuit 20 operates.

The output voltage Vo2 of the insulation type DC/DC converter 30 is supplied to the microcontroller 3 and other loads 4. Another DC/DC converter (not shown) configured to convert the voltage level may be arranged between the power supply terminal of the microcontroller 3 and the output terminal of the insulation type DC/DC converter 30, or otherwise between the power supply terminal of each circuit included in the loads 4 and the output terminal of the insulation type DC/DC converter 30.

Specifically, the PFC circuit 20 includes an inductor L1, a first switching transistor M1, a rectifier diode D1, an output capacitor C1, and a first control circuit 22.

The output voltage Vac' of the rectifier circuit 10 is applied to the first terminal of the inductor L1. The first switching transistor M1 is arranged between the second terminal of the inductor L1 and the ground terminal. The output capacitor C1 is arranged such that its first terminal is grounded and its second terminal is connected to the output line of the PFC circuit 20. The rectifier diode D1 is arranged such that its anode is connected to the second terminal of the inductor L1 and its cathode is connected to the output line. The PFC circuit 20 has the same topology as those of typical DC/DC converters (switching regulators), which is not restricted in particular.

The voltage Vfb1 that corresponds to the intermediate voltage Vo1 is fed back to the first control circuit 22. Furthermore, the first control circuit 22 receives, as input signals, a voltage detection signal S4 which represents the input voltage Vac' and a current detection signal S5 which represents the input current Iac. The voltage detection signal S4 and the current detection signal S5 can be generated by means of various kinds of methods. That is to say, the methods for generating the voltage detection signal S4 and the current detection signal S5 are not restricted in particular. For example, the voltage detection signal S4 may be generated by dividing the full-wave rectified AC voltage Vac', or by full-wave rectifying or otherwise half-wave rectifying the AC voltage Vac using a diode. On the other hand, the current detection signal S5 may be generated using voltage drop that occurs at a detection resistor Rs1 arranged on a path of a current that flows through the inductor L1, e.g., arranged between the source of the first switching transistor M1 and the ground terminal. Also, the current detection signal S5 may be generated using voltage drop that occurs at the first switching transistor M1.

In the enable state, the first control circuit 22 is configured to generate a first pulse signal S1 having a duty ratio adjusted such that the intermediate voltage Vo1 matches its target voltage level (400 V), and such that the phase of the input current Iac matches the phase of the input voltage Vac'. The first control circuit 22 is configured to drive the first switching transistor M1 according to the first pulse signal S1.

The microcontroller 3 is configured to output, via a photocoupler 40, an enable signal S3 which instructs the PFC circuit 20 to operate or to stop operating. The first control circuit 22 is configured to be switchable between the enable state and the disable state according to an instruction received from the microcontroller 3.

The internal circuit of the first control circuit 22 may be configured as a control circuit for known PFC circuits, and the circuit configuration thereof is not restricted in particular.

The insulation type DC/DC converter 30 includes a transformer TRS1, a rectifier diode D2, an output capacitor C2, a second switching transistor M2, a second control circuit 32, and an auxiliary converter 34.

The transformer TRS1 includes a primary winding W1 and an auxiliary winding W3 arranged on its primary side and a secondary winding W2 arranged on its secondary side. The intermediate voltage Vo1 output from the PFC circuit 20 is applied to the first terminal of the primary winding W1. The second switching transistor M2 is arranged between the second terminal of the primary winding W1 and the ground terminal.

The first terminal of the secondary winding W2 is grounded. The rectifier diode D2 is arranged between the second terminal of the secondary winding W2 and the output line such that its cathode is positioned on the output line side. The output capacitor C1 is arranged such that its first terminal is grounded, and its second terminal is connected to the output line.

The voltage Vfb2 that corresponds to the output voltage Vo2 is fed back to the first control circuit 22 via a photocoupler 42. Furthermore, the first control circuit 22 receives, as an input signal, a current detection signal S6 that corresponds to a coil current Ic1 that flows through the primary winding W1. Such a current detection signal S6 may be generated using voltage drop that occurs at a detection resistor Rs2 arranged on a path of the coil current Ic1, e.g., between the source of the second switching transistor M2 and the ground terminal. Also, the current detection signal S6 may be generated using voltage drop that occurs at the second switching transistor M2. The current detection signal S6 can be generated by means of various kinds methods. That is to say, the method for generating the current detection signal S6 is not restricted in particular.

In the enable state, the second control circuit 32 is configured to generate a second pulse signal S2 having a duty ratio that is adjusted such that the output voltage Vo2 of the insulation type DC/DC converter 30 matches its target voltage, and to drive the second switching transistor M2 according to the second pulse signal S2. When the coil current Ic1 that flows through the primary winding W1 reaches a predetermined threshold current Ith, the second control circuit 32 is configured to switch the pulse signal S2 to a level (low level) which turns off the second switching transistor M2. With the present embodiment, such an arrangement is configured to switch the threshold current Ith between at least two levels.

The second control circuit 32 starts the switching operation when the main power supply of the electronic device is turned on, e.g., when the state is switched from the shutdown state to the standby state. With such an arrangement, when the intermediate voltage Vo1 is higher than a predetermined level Vx, the second control circuit 32 sets the threshold current Ith to a first value Ith1, and when the intermediate voltage Vo1 is lower than the predetermined level Vx, the second control circuit 32 sets the threshold current Ith to a second value Ith2 that is lower than the first value Ith1. The predetermined level Vx is set to a value which is higher than the initial voltage level (141 V) of the intermediate voltage Vo1, and which is lower than, or on the order of, the target voltage level of the intermediate voltage Vo1 (400 V). Preferably, the predetermined level Vx may be set to a value ranging between 300 V and 400 V.

The first control circuit 22 may include, as an internal component, a comparator (not shown) configured to compare the intermediate voltage Vo1 with the predetermined level Vx. Also, the first control circuit 22 may be configured to output, to the second control circuit 32 by means of a comparator, a detection signal S7 which is asserted (e.g., set to high level) when the intermediate voltage Vo1 reaches the predetermined level Vx. Also, the second control circuit 32 may be configured to set the threshold current Ith to the first value Ith1 when the detection signal S7 is asserted, and to set the threshold current Ith to the second value Ith2 when the detection signal S7 is negated.

Alternatively, the second control circuit 32 may include such a comparator as an internal component.

The auxiliary converter 34 includes an auxiliary winding W3, a rectifier diode D3, and an output capacitor C3. When the second control circuit 32 starts the switching of the second switching transistor M2, a current voltage Vcc, which is stabilized to on the order of 3 V, for example, develops at the output capacitor C3. The DC voltage Vcc is used as the power supply voltage for the first control circuit 22 and the second control circuit 32. It should be noted that the DC voltage Vcc is not generated before the PFC circuit 20 starts to operate. Rather, in this period, the first control circuit 22 and the second control circuit 32 each operate using the AC voltage Vac or otherwise Vac' as the power supply voltage.

The above is the configuration of the electronic device 1. Next, description will be made regarding the operation thereof.

Figure 3:
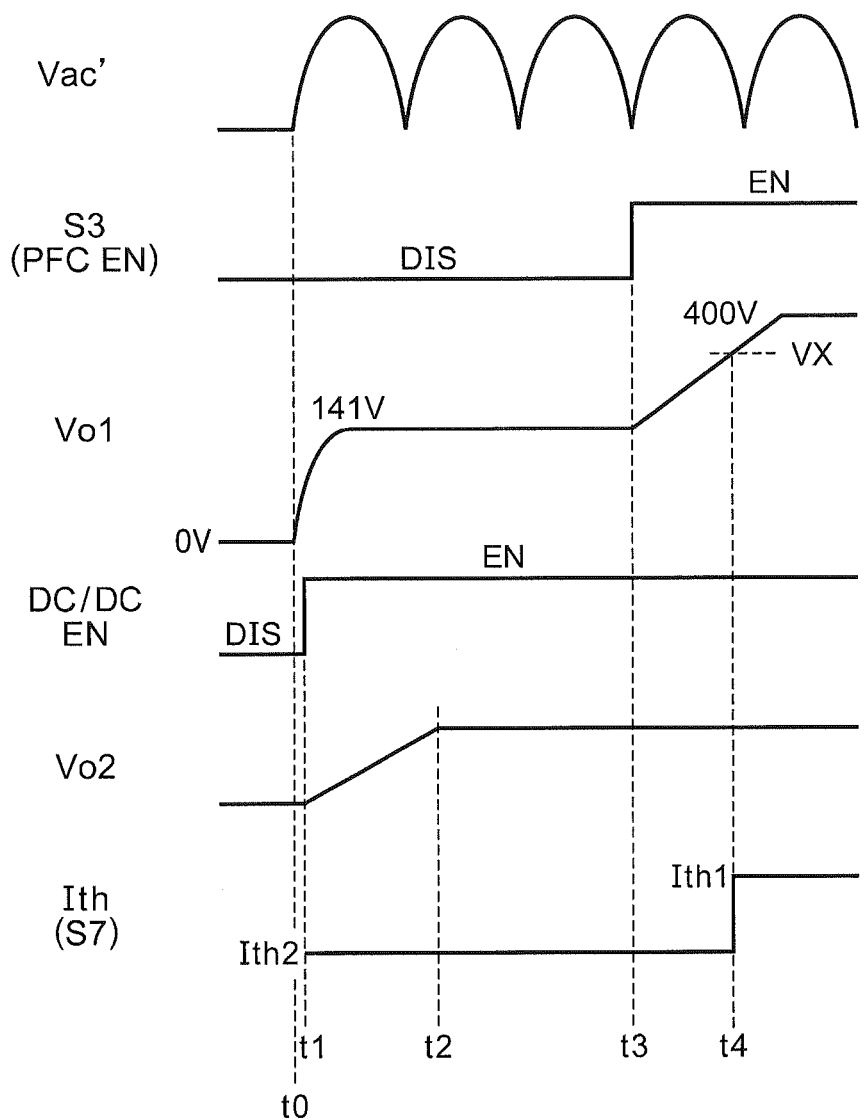
FIG. 3 is a time chart which shows the operation of the power supply apparatus shown in FIG. 2.

FIG. 3 is a time chart which shows the operation of the power supply apparatus 2 shown in FIG. 2. FIG. 3 shows the rectified AC voltage Vac', the enable signal S3 (the enable state of the first control circuit 22), the intermediate voltage Vo1, the enable/disable state of the second control circuit 32, and the output voltage Vo2 of the insulation type DC/DC converter 30, in this order beginning from the top. It should be noted that the vertical axis and the horizontal axis shown in the waveform diagrams and the time charts in the present specification are expanded or reduced as appropriate for ease of understanding. Also, each waveform shown in the drawings is simplified for ease of understanding.

When, at the time point t0, the main power supply switch is turned on and the AC voltage Vac is supplied to the power supply apparatus 2, the full-wave rectified AC voltage Vac' is input to the PFC circuit 20. In this stage, the enable signal S3, which is an instruction to start an operation, is not input from the microcontroller. Thus, in this state, the first control circuit 22 is set to the disable state (DIS). Thus, the output voltage Vo1 of the PFC circuit 20 rises to the vicinity of 141 V, and is maintained at an approximately constant level.

When, at the time point t1, the power supply voltage for the second control circuit 32 rises to a level which allows the second control circuit 32 to operate, the second control circuit 32 is set to the enable state. In this state, the output voltage Vo2 starts to rise up to its target voltage level.

In this stage, the intermediate voltage Vo1 is lower than the predetermined level Vx, and accordingly, the detection signal S7 is negated. Thus, the threshold current Ith to be compared with the coil current Ic1 is set to the first value Ith2. In this state, the insulation type DC/DC converter 30 operates in a state in which the on period Ton2 of the second switching transistor M2 is limited to a short period of time. Subsequently, at the time point t2, the output voltage Vo2 of the insulation type DC/DC converter 30 rises up to the target voltage. In this stage, the electronic device 1 enters the standby state.

When the standby switch is turned on at the time point t3 after the electronic device 1 enters the standby state, the state is switched from the standby state to the normal operating state, and the microcontroller 3 asserts the enable signal S3 to be supplied to the PFC circuit 20. Upon receiving the enable signal S3 thus asserted, the PFC circuit 20 starts to operate, and accordingly, the intermediate voltage Vo1 starts to rise toward its target voltage level, i.e., 400 V. That is to say, the PFC circuit 20 is configured to operate only in the normal operating state. When the intermediate voltage Vo2 reaches the predetermined level Vx at the time point t4, the detection signal S7 is asserted, and the threshold current Ith for the second control circuit 32 is set to the first value Ith1. In this stage, the limitation on the on period Ton2 of the second switching transistor M2 is removed.

The above is the operation of the power supply apparatus 2.

Figure 1:
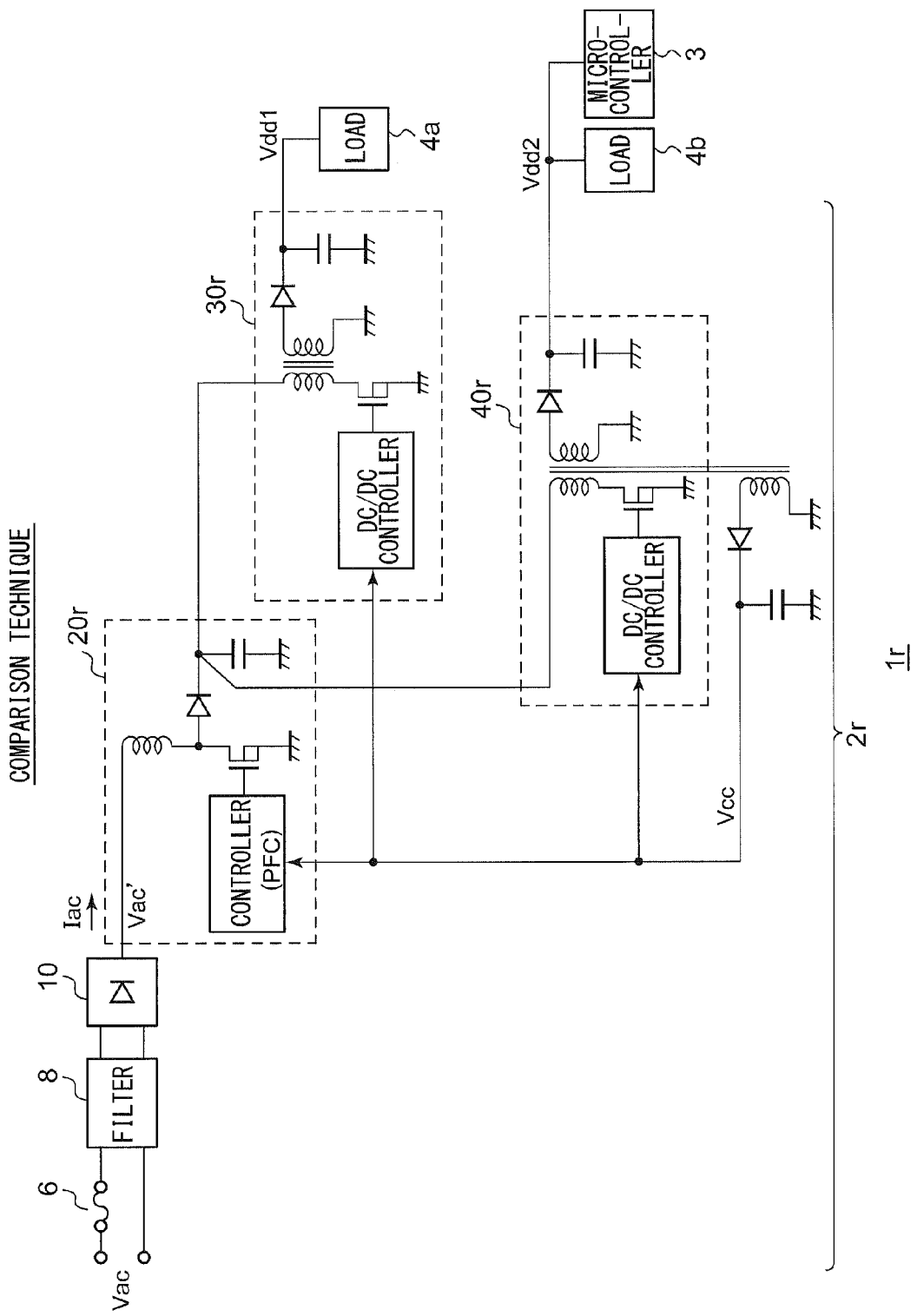
FIG. 1 is a block diagram which shows a configuration of an electronic device including a power supply apparatus according to a comparison technique investigated by the present inventors.

Such a power supply apparatus 2 shown in FIG. 2 only requires such an insulation type DC/DC converter to be configured as a single circuit, as compared with the power supply apparatus 2r shown in FIG. 1. Thus, such an arrangement provides advantages of a reduced cost, a reduced number of circuit components, and a reduced circuit area.

With the power supply apparatus 2 shown in FIG. 2, electric power is supplied to the microcontroller 3 and the load 4 by means of a single insulation type DC/DC converter. Thus, such a single insulation type DC/DC converter 30 operates in both the standby state and the normal operating state. On the other hand, from the viewpoint of reducing power consumption, there is no need to operate the PFC circuit 20 in the standby state. That is to say, the PFC circuit 20 is preferably set to the enable state only in the normal operating state. However, as described above, the output voltage Vo1 of the PFC circuit 20 greatly changes between the initial voltage level (141 V), which is generated in the disable state, and the target voltage level (400 V), which is generated in the enable state. This leads to a great change in the input voltage of the insulation type DC/DC converter 30.

Figure 4A:
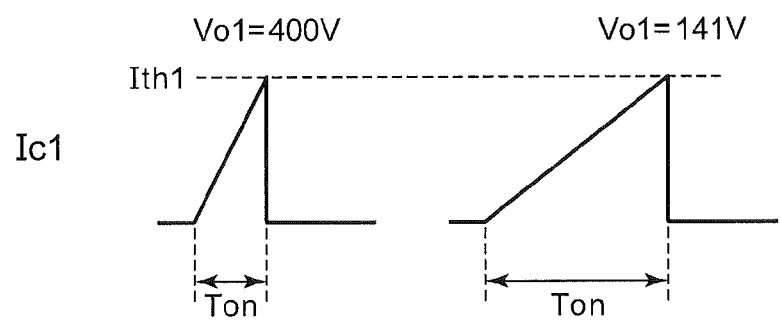
FIG. 4A is a diagram which shows the waveform of the coil current Ic that flows through an insulation type DC/DC converter for a single cycle in a case in which the threshold current Ith is not switchable.
Figure 4B:
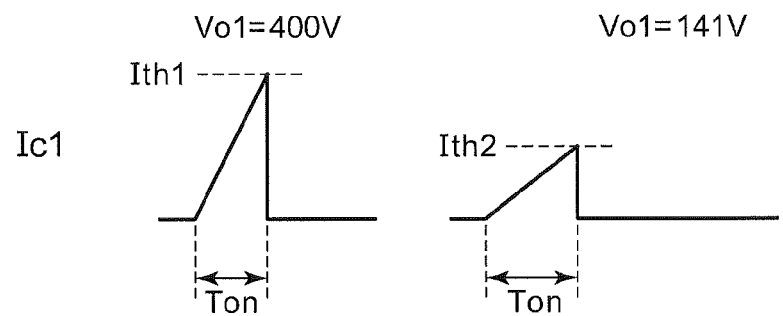
FIG. 4B is a diagram which shows the waveform thereof in a case in which the threshold current Ith is switchable.

FIG. 4A is a diagram which shows a waveform of the coil current Ic1 that flows through the insulation type DC/DC converter for a single cycle in a case in which the threshold current Ith is not switchable, and FIG. 4B is a diagram which shows a waveform thereof in a case in which the threshold current Ith is switchable.

In order to clarify the advantage of the power supply apparatus 2 shown in FIG. 2 configured to be capable of switching the threshold current, first, description will be made with reference to FIG. 4A regarding the operation of an arrangement in which the threshold current Ith is not switchable.

The slope of the coil current Ic1 is proportional to the voltage that develops between both terminals of the primary winding W1, i.e., the intermediate voltage Vo1. That is to say, when the intermediate voltage Vo1 is set to the target voltage level (400 V), the coil current Ic1 has a steep slope, which leads to a short on time Ton. On the other hand, when the intermediate voltage Vo1 is set to the initial voltage level (141 V), the coil current Ic1 has a gentle slope, which leads to a long on time Ton.

Typically, the threshold current Ith is determined from the viewpoint of protecting the transformer TRS1 of the insulation type DC/DC converter 30 and the first switching transistor M1. Thus, the threshold current Ith is set to a somewhat high level.

The electric power Po consumed by the insulation type DC/DC converter 30 is represented by the following Expression (1).

$$Po = 1/2 \times L \cdot I^2 \cdot f_{sw} = \qquad (1)$$
$$1/2 \times L \cdot Vo1^2/L^2 \times Ton^2 \times f_{sw} = (Vo1^2/2L) \times Ton^2 \times f_{sw}$$

That is to say, with such an arrangement in which the insulation type DC/DC converter 30 is configured as a single circuit, the on time becomes long when the intermediate voltage Vo1 is set to a low value, as compared with an arrangement in which the insulation type DC/DC converter 30 is configured as two circuits. Thus, such an arrangement leads to a problem of increased power consumption. The above-described problem is by no means within the scope of common and general knowledge in the field of the present invention. Furthermore, it can be said that the present applicant has been the first to arrive at this problem.

In order to reduce the power consumption in such a state in which the intermediate voltage is low, there is a need to increase the size of the second switching transistor M2 so as to reduce the on resistance of the second switching transistor M2, thereby reducing power loss. However, such an arrangement leads to a problem of a great increase in the cost of the insulation type DC/DC converter 30.

As described below, the power supply apparatus 2 shown in FIG. 2 is capable of solving such a problem.

Referring to FIG. 4B, description will be made regarding the operation of the power supply apparatus 2 shown in FIG. 2 for switching the threshold current Ith. In a state in which the intermediate voltage Vo1 is low, the threshold current Ith is set to the second value Ith2, which limits the on time of the second switching transistor M2 to a short period.

In this state, the power consumption represented by Expression (1) becomes small. Thus, such an arrangement does not require the second switching transistor M2 to have a large size, thereby suppressing an increase in the cost of the insulation type DC/DC converter 30 and an increase in the circuit area.

After the intermediate voltage Vo1 becomes sufficiently high, such an arrangement increases the threshold current Ith to a sufficiently high level Ith1, thereby providing an efficient operation while maintaining a range which has no effect on the reliability of the first switching transistor M1 and the transformer TRS1.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the threshold current Ith is switched based upon the comparison result between the intermediate voltage Vo1 and the predetermined level Vx. However, the method for switching the threshold current Ith is not restricted to such an arrangement.

The period of time required for the intermediate voltage Vo1 to reach the predetermined level Vx after the startup operation can be estimated beforehand. Thus, the second control circuit 32 may be configured to set the threshold current Ith to the first value Ith1 after a predetermined period of time elapses after the power supply is turned on, and to set the threshold current Ith to the second value Ith2 that is lower than the first value Ith1 until the predetermined period of time elapses. The predetermined period of time may be counted by means of a timer circuit.

Description has been made in the embodiment regarding an arrangement configured to instruct the PFC circuit 20 to stop operating in the standby state, and to instruct the PFC circuit 20 to operate only in the normal operating state. However, the present invention is not restricted to such an arrangement. Also, when the output voltage Vo2 of the insulation type DC/DC converter 30 reaches the target level, the microcontroller 3 may be configured to output the enable signal S3 to the first control circuit 22 in order to immediately set the PFC circuit 20 to the operating state.

Description has been made in the embodiment regarding an arrangement in which the first control circuit 22 and the second control circuit 32 are configured as separate ICs. Also, the first control circuit 22 and the second control circuit 32 may be integrally formed on a single semiconductor substrate.

Description has been made in the embodiment regarding an arrangement in which the DC/DC converter 100 is mounted on the electronic device 1. However, the present invention is not restricted to such an arrangement. Also, the present invention may be applied to various kinds of such power supply apparatuses 2. For example, such a DC/DC converter 100 may be applied to an AC adapter configured to supply electric power to an electronic device. Examples of such electronic devices include laptop computers, desktop computers, cellular phone terminals, and CD players, etc. However, such an electronic device is not restricted in particular.

Figure 5:
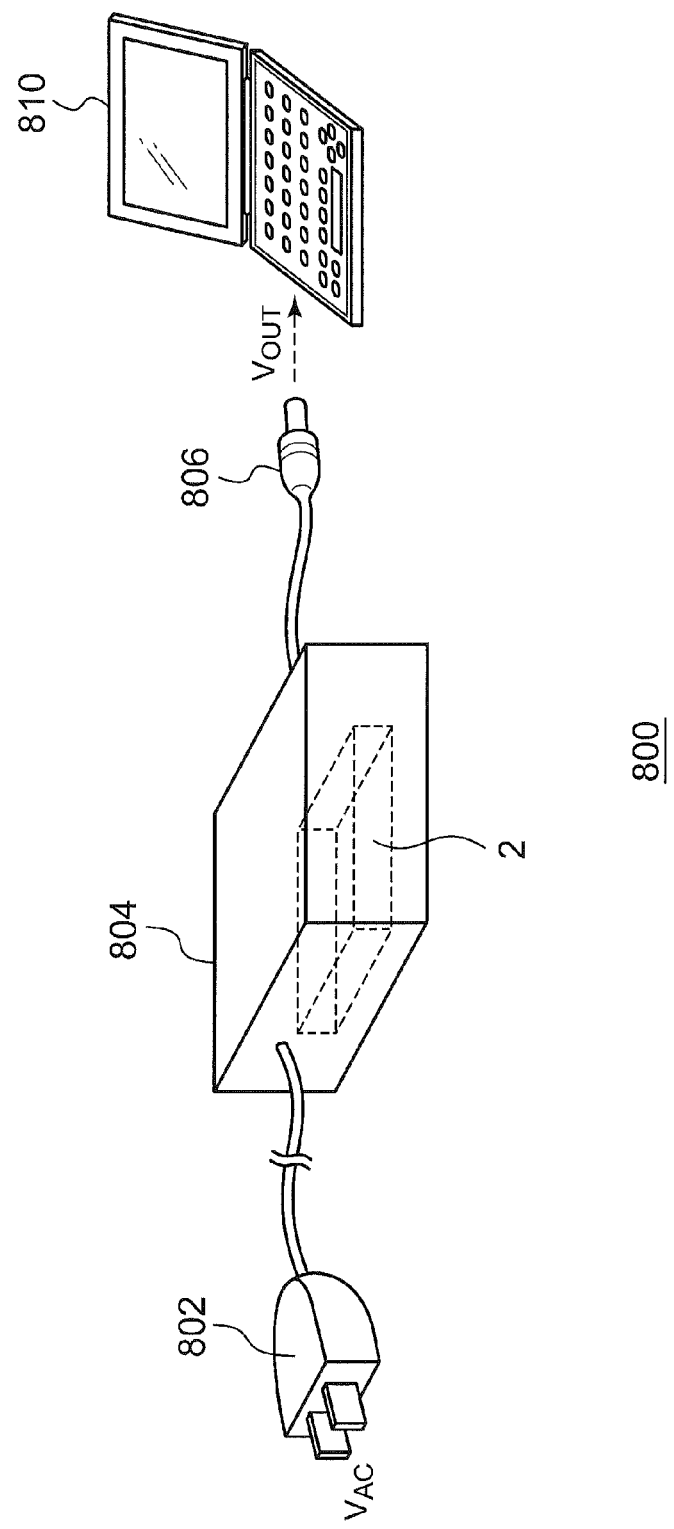
FIG. 5 is a diagram which shows an AC adapter including an inverter.

FIG. 5 is a diagram which shows an AC adapter 800 including the power supply apparatus 2. The AC adapter 800 includes a plug 802, a casing 804, and a connector 806. The plug 802 is configured to receive commercial AC voltage $V_{AC}$ from an unshown electrical outlet. The power supply apparatus 2 is mounted within the casing 804. The DC output voltage $V_{OUT}$ generated by the power supply apparatus 2 is supplied to an electronic device 810 via the connector 806. Examples of such an electronic device 810 include laptop PCs, digital still cameras, digital video cameras, cellular phone terminals, portable audio players, etc.

Figure 6A:
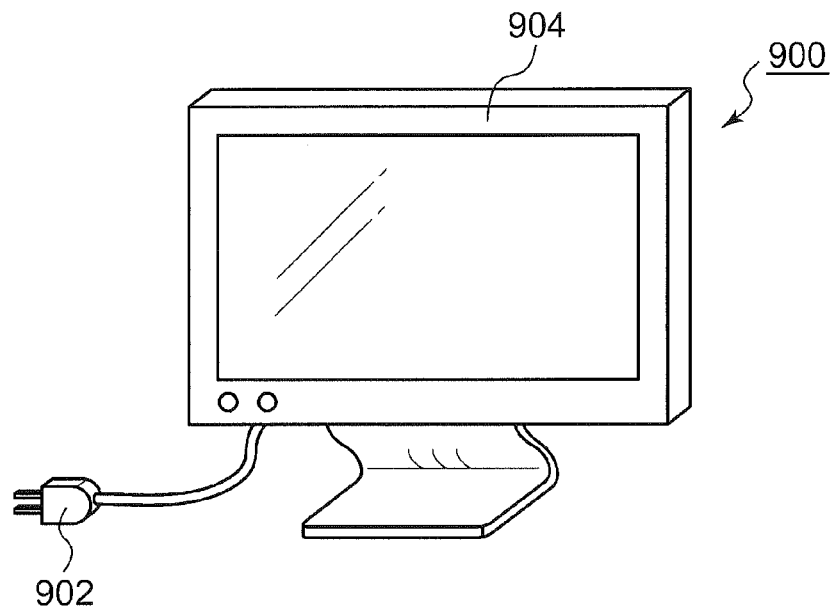
FIGS. 6A and 6B are diagrams each showing an electronic device including an inverter.
Figure 6B:
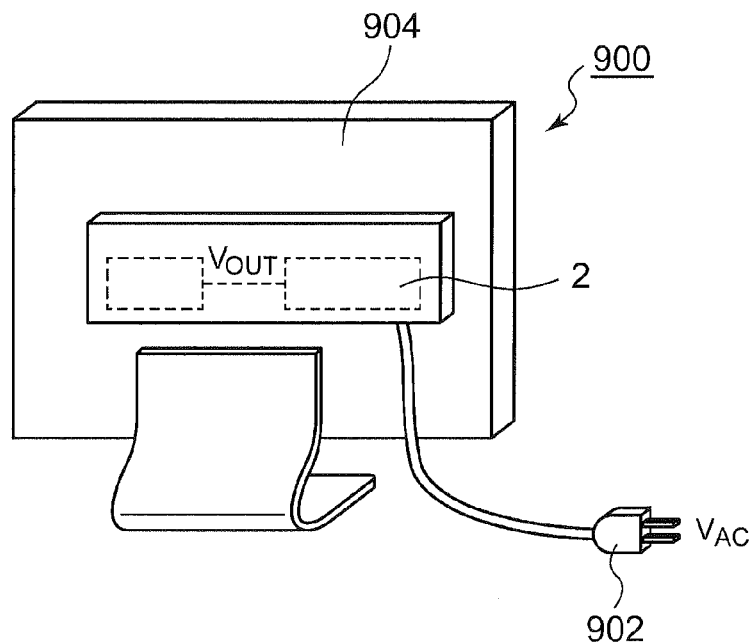

FIGS. 6A and 6B are diagrams each showing an electronic device 900 including the power supply apparatus 2. The electronic device 900 shown in FIGS. 6A and 6B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 is configured to receive commercial AC voltage $V_{AC}$ from an unshown electrical outlet. The power supply apparatus 2 is mounted within the casing 804. The DC output voltage $V_{OUT}$ generated by the power supply apparatus 2 is supplied to loads mounted within the same casing 904, examples of which include a microcontroller, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:

1. A power supply apparatus comprising:
   a rectifier circuit configured to full-wave rectify AC voltage;
   a power factor correction circuit including a non-insulation type DC/DC converter configured to receive an output voltage of the rectifier circuit, and to generate a DC intermediate voltage, and configured to operate such that the phase of the input current matches the phase of the AC voltage thus rectified;
   an insulation type DC/DC converter configured to receive the intermediate voltage, and to convert the level of the intermediate voltage thus received; and
   a microcontroller configured to operate receiving an output voltage of the insulation type DC/DC converter,
   wherein the power factor correction circuit comprises:
      an inductor arranged such that the output voltage of the rectifier circuit is applied to its first terminal;
      a first switching transistor arranged between a second terminal of the inductor and a ground terminal; and
      a first control circuit configured to generate a first pulse signal having a duty ratio such that the intermediate voltage matches its target voltage, and to drive the first switching transistor according to the first pulse signal,
   and wherein the insulation type DC/DC converter comprises:
      a transformer;
      a second switching transistor arranged between a primary winding of the transformer and the ground terminal; and
      a second control circuit configured to generate a second pulse signal having a duty ratio such that the output voltage of the insulation type DC/DC converter matches its target voltage, to drive the second switching transistor according to the second pulse signal, and to switch the pulse signal to a level which turns off the second switching transistor when a coil current that flows through the primary winding reaches a predetermined threshold current;
      wherein the first control circuit is configured to start a switching operation upon receiving an instruction from the microcontroller to start operating.

2. The power supply apparatus according to claim 1, wherein the second control circuit is configured to start a switching operation when a power supply for an electronic device is turned on, to set the threshold current to a first value when the intermediate voltage is higher than a predetermined level, and to set the threshold current to a second value that is lower than the first value when the intermediate voltage is lower than a predetermined level.

3. The power supply apparatus according to claim 1, further comprising a first photocoupler connected to receive the instruction from the microcontroller and to output the instruction to the first control circuit.

4. The power supply apparatus according to claim 1, wherein the first control circuit is configured to detect whether or not the intermediate voltage reaches a predetermined level, and to be capable of notifying the second control circuit of the detection result.

5. The power supply apparatus according to claim 4, wherein the first control circuit and the second control circuit are respectively integrated on separate respective semiconductor substrates.

6. The power supply apparatus according to claim 1, wherein the second control circuit is configured to start a switching operation when a power supply for an electronic device is turned on, to set the threshold current to a first value after a predetermined period of time elapses after the power supply is turned on, and to set the threshold current to a second value that is lower than the first value until the predetermined period of time elapses.

7. The power supply apparatus according to claim 6, wherein the first control circuit is configured to start a switching operation upon receiving an instruction from the microcontroller to start operating.

8. The power supply apparatus according to claim 7, further comprising a first photocoupler connected to receive the instruction from the microcontroller and to output the instruction to the first control circuit.

9. The power supply apparatus according to claim 1, wherein the first control circuit and the second control circuit are monolithically integrated on a single semiconductor substrate.

10. A power supply apparatus comprising:
a rectifier circuit configured to full-wave rectify AC voltage;
a power factor correction circuit including a non-insulation type DC/DC converter configured to receive an output voltage of the rectifier circuit, and to generate a DC intermediate voltage, and configured to operate such that the phase of the input current matches the phase of the AC voltage thus rectified;
an insulation type DC/DC converter configured to receive the intermediate voltage, and to convert the level of the intermediate voltage thus received; and
a microcontroller configured to operate receiving an output voltage of the insulation type DC/DC converter,
wherein the power factor correction circuit comprises:
an inductor arranged such that the output voltage of the rectifier circuit is applied to its first terminal;
a first switching transistor arranged between a second terminal of the inductor and a ground terminal; and
a first control circuit configured to generate a first pulse signal having a duty ratio such that the intermediate voltage matches its target voltage, and to drive the first switching transistor according to the first pulse signal,
and wherein the insulation type DC/DC converter comprises:
a transformer;
a second switching transistor arranged between a primary winding of the transformer and the ground terminal; and
a second control circuit configured to generate a second pulse signal having a duty ratio such that the output voltage of the insulation type DC/DC converter matches its target voltage, to drive the second switching transistor according to the second pulse signal, and to switch the pulse signal to a level which turns off the second switching transistor when a coil current that flows through the primary winding reaches a predetermined threshold current; and
wherein the power supply apparatus comprises a second photocoupler connected to receive a signal indicative of the output voltage of the insulation type DC/DC converter and to output the signal to the second control circuit.

11. A power supply apparatus comprising:
a rectifier circuit configured to full-wave rectify AC voltage;
a power factor correction circuit including a non-insulation type DC/DC converter configured to receive an output voltage of the rectifier circuit, and to generate a DC intermediate voltage, and configured to operate such that the phase of the input current matches the phase of the AC voltage thus rectified;
an insulation type DC/DC converter configured to receive the intermediate voltage, and to convert the level of the intermediate voltage thus received; and
a microcontroller configured to operate receiving an output voltage of the insulation type DC/DC converter,
wherein the power factor correction circuit comprises:
an inductor arranged such that the output voltage of the rectifier circuit is applied to its first terminal;
a first switching transistor arranged between a second terminal of the inductor and a ground terminal; and
a first control circuit configured to generate a first pulse signal having a duty ratio such that the intermediate voltage matches its target voltage, and to drive the first switching transistor according to the first pulse signal,
and wherein the insulation type DC/DC converter comprises:
a transformer;
a second switching transistor arranged between a primary winding of the transformer and the ground terminal; and
a second control circuit configured to generate a second pulse signal having a duty ratio such that the output voltage of the insulation type DC/DC converter matches its target voltage, to drive the second switching transistor according to the second pulse signal, and to switch the pulse signal to a level which turns off the second switching transistor when a coil current that flows through the primary winding reaches a predetermined threshold current;
and wherein the power supply apparatus comprises an auxiliary converter coupled to generate a DC voltage and to supply the first control circuit the DC voltage based on a switching operation of the second switching transistor.

12. The power supply apparatus according to claim 11, wherein the auxiliary converter is coupled to supply the second control circuit the DC voltage.

13. An electronic device comprising a power supply apparatus, wherein the power supply apparatus comprises:
a rectifier circuit configured to full-wave rectify AC voltage;
a power factor correction circuit including a non-insulation type DC/DC converter configured to receive an output voltage of the rectifier circuit, and to generate a DC intermediate voltage, and configured to operate such that the phase of the input current matches the phase of the AC voltage thus rectified;

an insulation type DC/DC converter configured to receive the intermediate voltage, and to convert the level of the intermediate voltage thus received; and a microcontroller configured to operate receiving an output voltage of the insulation type DC/DC converter, wherein the power factor correction circuit comprises:

an inductor arranged such that the output voltage of the rectifier circuit is applied to its first terminal;

a first switching transistor arranged between a second terminal of the inductor and a ground terminal; and a first control circuit configured to generate a first pulse signal having a duty ratio such that the intermediate voltage matches its target voltage, and to drive the first switching transistor according to the first pulse signal, and wherein the insulation type DC/DC converter comprises:

a transformer;

a second switching transistor arranged between a primary winding of the transformer and the ground terminal; and a second control circuit configured to generate a second pulse signal having a duty ratio such that the output voltage of the insulation type DC/DC converter matches its target voltage, to drive the second switching transistor according to the second pulse signal, and to switch the pulse signal to a level which turns off the second switching transistor when a coil current that flows through the primary winding reaches a predetermined threshold current wherein the first control circuit is configured to start a switching operation upon receiving an instruction from the microcontroller to start operating.

* * * * *